US012440551B2

United States Patent
Tian et al.

(10) Patent No.: US 12,440,551 B2
(45) Date of Patent: *Oct. 14, 2025

(54) tFIBER PROTEIN FRAGMENT OF AVIAN EGG DROP SYNDROME VIRUS AND VACCINE COMPOSITION PREPARED THEREOF, PREPARATION METHOD AND USE

(71) Applicant: PULIKE BIOLOGICAL ENGINEERING, INC., Luoyang (CN)

(72) Inventors: Kegong Tian, Henan (CN); Mengyue Wang, Henan (CN); Wujie Liu, Henan (CN); Xuke Zhang, Henan (CN)

(73) Assignee: PULIKE BIOLOGICAL ENGINEERING INC, Luoyang (CN)

( * ) Notice: Subject to any disclaimer, the term of this patent is extended or adjusted under 35 U.S.C. 154(b) by 726 days.

This patent is subject to a terminal disclaimer.

(21) Appl. No.: 17/754,280

(22) PCT Filed: Jul. 14, 2020

(86) PCT No.: PCT/CN2020/101961
§ 371 (c)(1),
(2) Date: Mar. 29, 2022

(87) PCT Pub. No.: WO2021/073178
PCT Pub. Date: Apr. 22, 2021

(65) Prior Publication Data
US 2022/0265811 A1  Aug. 25, 2022

(30) Foreign Application Priority Data
Oct. 17, 2019  (CN) .................. 201910990285.0

(51) Int. Cl.
| A61K 39/145 | (2006.01) |
| A61K 39/17 | (2006.01) |
| A61K 39/215 | (2006.01) |
| A61K 39/235 | (2006.01) |
| A61K 39/39 | (2006.01) |
| A61P 31/20 | (2006.01) |

(52) U.S. Cl.
CPC ............ *A61K 39/145* (2013.01); *A61K 39/17* (2013.01); *A61K 39/215* (2013.01); *A61K 39/235* (2013.01); *A61K 39/39* (2013.01); *A61P 31/20* (2018.01)

(58) Field of Classification Search
CPC ...... Y02E 60/10; A61K 39/17; A61K 39/215; A61K 39/235; A61K 2039/552; A61K 2039/53; A61K 39/12; A61P 31/20; A61P 31/14
See application file for complete search history.

(56) References Cited

U.S. PATENT DOCUMENTS

| 2,909,462 A | 10/1959 | Warfield et al. |
| 10,821,172 B2 * | 11/2020 | Tian .................. A61K 39/145 |

FOREIGN PATENT DOCUMENTS

| CN | 107281479 A | 10/2017 |
| CN | 107523556 A | 12/2017 |
| CN | 108653724 A | 10/2018 |
| CN | 108653725 A | 10/2018 |
| JP | 2019512461 A | 5/2019 |
| WO | 2004078977 A | 9/2004 |
| WO | 2015024932 A1 | 2/2015 |

OTHER PUBLICATIONS

Song, Y.P. et al. "development of novel subunit vaccine based on truncated fiber protein of egg drop syndrome virus and its immunogenicity in chickens" Virus Research, vol. vol. 272, Aug. 20, 2019 (Aug. 10, 2019).
Harakuni, T. et al. "Fiber knob domain lacking the shaft sequence but fused to a coiled coil is a candidate subunit vaccine against egg drop-syndrome" Vaccine, vol. 34, Apr. 20, 2016 (Apr. 20, 2016).
Kiyotaka Suenaga, et al., "A Recombinant Vaccine Against Egg Drop Syndrome of Chickens" Sci. Rep. Chemo-Sero-Therap. Res. Inst., 2010, vol. 19, pp. 51-60 (https://www.kaketsuken.org/rei/book19/html5.html#page=59).

* cited by examiner

*Primary Examiner* — Bao Q Li
(74) *Attorney, Agent, or Firm* — John A. Miller; Shumaker, Loop & Kendrick, LLP

(57) ABSTRACT

The present disclosure provides a tFiber protein fragment of avian egg drop syndrome virus, wherein the gene that encoded the tFiber protein fragment of avian egg drop syndrome virus has a nucleotide sequence shown in SEQ ID NO. 2 or a degenerate sequence thereof, and a vaccine composition prepared from the protein fragment. The fragment has good immunogenicity and is capable of preparing combined vaccine with various antigens, producing complete protection to the chickens and ducks.

13 Claims, No Drawings
Specification includes a Sequence Listing.

tFIBER PROTEIN FRAGMENT OF AVIAN EGG DROP SYNDROME VIRUS AND VACCINE COMPOSITION PREPARED THEREOF, PREPARATION METHOD AND USE

CROSS-REFERENCE TO RELATED APPLICATIONS

This application is a National Stage application of International Application No. PCT/CN2020/101961 filed on Jul. 14, 2020, which claims priority to Chinese Application No. 201910990285.0 filed Oct. 17, 2019.

BACKGROUND

Field

The present disclosure relates to a tFiber protein fragment of avian egg drop syndrome virus and a vaccine composition prepared thereof, a preparation method and use, belonging to the field of biomedicine.

Discussion of the Related Art

Avian egg drop syndrome virus (EDSV) belongs to the group III of avian adenovirus. Poultry infected with this virus has no obvious clinical symptom, some of which may have slight diarrhea. The infection occurs frequently during a peak period of egg laying, resulting in soft eggshells, thin eggshells, shell-less eggs and a serious decline in egg production rate, and causing serious economic losses.

EDSV has a typical morphology of adenovirus, without any envelope and with hemagglutination activity, which proliferates in the fallopian tubes of poultry. The genome of the EDSV is a linear double-stranded DNA of about 33 kb. The viral particles consist of structural proteins. The nucleocapsid has a diameter of 70 to 80 nm, and is icosahedrally symmetrical with DNA encapsidated in the capsid. The nucleocapsid consists of 252 capsid particles, of which 240 are hexon (Hexon proteins), forming 20 faces and most edges of an icosahedron. These capsid particles are prismatic, 7 nm wide and 11 nm long. The other 12 are pentons (Penton proteins), located at 12 vertices of the icosahedron. Each Penton protein has a fiber protrusion (Fiber protein).

The avian egg drop syndrome is currently one of the most crucial diseases that seriously endanger the development of poultry industry in the world. Among various prevention and control measures, vaccination is still the most vital measure. The current EDS inactivated vaccine commonly used in the poultry industry is a vaccine obtained through inactivation of viruses, which have amplified in duck embryos, and then emulsification of viruses with a mineral oil adjuvant. However, since it is difficult to obtain a high titer of virus from cultivation of EDSV in duck embryos, it is often difficult to provide a desired immune effect with prepared vaccine. In addition, the way of production of the virus antigen is completely dependent on the duck hatching eggs. Once influenza and other infectious diseases occur, supply of duck hatching eggs could be insufficient which would seriously affect prevention and control of avian egg drop syndrome. In addition, there is a risk of biosafety caused by incomplete inactivation of viruses during production of whole-virus vaccine.

Subunit vaccine is a new reliable type of genetically engineered vaccine developed in recent years. Hexon (240/252) is a main object in the study of subunit vaccine of avian egg drop syndrome virus. However, the immunological efficiency of its subunit vaccine has been low, and the subunit vaccine has not been developed into products. So far no subunit vaccine of EDSV has appeared on the market. Therefore, it is urgently necessary to develop a subunit vaccine composition with good immunological effect, which can effectively prevent the spread of the disease and can be free from the influence of fluctuation of duck egg supply.

Combined vaccine for various epidemic diseases can generate antibodies for various pathogens by one injection and represents a direction for vaccine development. The preparation of the combined vaccine faces various restrictions in practice. Antigen concentration technology may be one of the restrictions. The more antigens are used in the combined vaccine, the higher the concentration is required. For most of the existing poultry vaccines of which antigens are produced via avian embryos, the high concentration technology restricts their research and development. Furthermore, when subunit antigens are used to replace whole bacteria or whole virus antigens, the endotoxins produced by expressing subunit antigens will increase as more antigens are used in the combined vaccine. When there are two or more subunit antigens in the vaccine, the content of endotoxin is very high, which is not suitable for preparing a combined vaccine. Therefore, it is urgently necessary to overcome the above difficulties to develop a combined vaccine against major epidemic diseases of poultry.

SUMMARY

In order to solve the defects of the prior art, the invention provides an immunogenic protein of avian egg drop syndrome virus, a vaccine composition prepared therefrom, and a preparation method and use of the vaccine composition; the vaccine composition can effectively prevent and/or treat infection of the avian egg drop syndrome virus.

The disclosure relates to a tFiber protein fragment of avian egg drop syndrome virus, wherein the gene that encodes the tFiber protein fragment of avian egg drop syndrome virus has a nucleotide sequence shown in SEQ ID NO. 2 or a degenerate sequence thereof.

The disclosure further relates a vaccine composition, wherein the vaccine composition comprises an immune amount of tFiber protein fragment of avian egg drop syndrome virus or an immune amount of live vector recombined with the gene of the tFiber protein fragment of avian egg drop syndrome virus, and a pharmaceutically acceptable carrier.

The present disclosure is the first to prepare the vaccine composition by adopting the tFiber protein fragment of the avian egg drop syndrome virus and efficient expression of the gene of selected tFiber protein fragment of the avian egg drop syndrome virus. The vaccine composition prepared by the tFiber protein fragment of the avian egg drop syndrome virus can prevent and/or treat an outbreak of the egg drop syndrome, and the body of the animal after being immunized with the vaccine composition containing the protein can rapidly produce antibody. The vaccine composition has good prevention and control effect on infection of the avian egg drop syndrome virus alone or in combination with other viruses, with good biosecurity.

The vaccine composition prepared by the tFiber protein fragment of the avian egg drop syndrome virus can provide complete protection to the chickens and ducks with good immunogenicity, and can be used for preventing and/or treating the infection of avian EDSV in clinical practice.

The present disclosure further relates to a method for preparing said vaccine composition, wherein said method comprises: step (1), cloning a gene of the tFiber protein fragment of the avian egg drop syndrome virus and recombining the gene of the tFiber protein fragment of the avian egg drop syndrome virus into an expression vector so as to obtain a recombinant expression vector recombined with the gene of the tFiber protein fragment of the avian egg drop syndrome virus; step (2), transforming the recombinant expression vector recombined with the gene of the tFiber protein fragment of the avian egg drop syndrome virus and an expression vector of a molecular chaperone into *Escherichia coli* in order to express the tFiber protein fragment of the avian egg drop syndrome virus; step (3), treating the expressed tFiber protein fragment of the avian egg drop syndrome virus with a non-ionic surfactant in order to remove endotoxin; and step (4), mixing the tFiber protein fragment of the avian egg drop syndrome virus in which the endotoxin is removed with an adjuvant to obtain the vaccine composition.

The disclosure further relates to a use of the vaccine composition for the manufacture of a medicament for treatment and/or prevention of infection of avian egg drop syndrome virus.

DETAILED DESCRIPTION OF THE EMBODIMENTS

Hereinafter, embodiments of the present disclosure will be described.

The term "Avian Egg Drop Syndrome Virus" (EDSV) belongs to group III of avian adenovirus and the genome is double-stranded DNA. The resulting clinical symptoms include production of soft eggshells, thin eggshells, and shell-less eggs, and a serious decline in egg production rate. Pathological changes are characterized by ovarian quiescence and tubal atrophy.

The disclosure relates to a tFiber protein fragment of avian egg drop syndrome virus, wherein the gene that encodes the tFiber protein fragment of avian egg drop syndrome virus has a nucleotide sequence shown in SEQ ID NO. 2 or a degenerate sequence thereof.

The tFiber protein fragment of avian egg drop syndrome virus disclosed herein has good immunogenicity, providing immune protection at a low content with a better immune effect than that of full-length Fiber protein of avian egg drop syndrome virus.

The disclosure further relates to a vaccine composition, wherein the vaccine composition comprises an immune amount of the tFiber protein fragment of avian egg drop syndrome virus or an immune amount of live vector recombined with a gene of the tFiber protein fragment of avian egg drop syndrome virus, and a pharmaceutically acceptable carrier; the gene that encodes the tFiber protein fragment of avian egg drop syndrome virus has a nucleotide sequence shown in SEQ ID NO. 2 or a degenerate sequence thereof.

The immunogenic component of the vaccine composition of the present invention, the tFiber protein fragment of avian egg drop syndrome virus, can still ensure a good immune effect when a fairly low immune dose is used.

The term "vaccine composition" as used in the present disclosure refers to a pharmaceutical composition having immunogenicity of avian egg drop syndrome virus, which can induce, stimulate or enhance the immune response of chickens and ducks to the egg drop syndrome virus.

The term "immune amount" should be understood as an "immunologically effective amount," also refers to an immunoprotective amount or an effective amount to produce an immune response, which is an amount of antigen effective to induce an immune response in a body of a recipient, which immune amount is sufficient to prevent or ameliorate signs or symptoms of a disease including adverse health effects or complications of the disease. The immune response may be sufficient for diagnostic purposes or other tests or may be suitable for use in preventing signs or symptoms of a disease, including adverse health consequences caused by an infection caused by a pathogen, or complications of the disease. Humoral immunity or cell-mediated immunity or both may be induced. The immune response of the animal to the immunogenic composition may be assessed indirectly, for example, by measuring antibody titers and analyzing lymphocyte proliferation, or directly by monitoring signs or symptoms after challenge with wild-type strains, while protective immunity provided by the vaccine may be assessed by measuring, for example, clinical signs of subjects such as mortality, reduction in morbidity, temperature values, and overall physiological condition and overall health and performance of the subjects. The immune response may include, but is not limited to induction of cellular and/or humoral immunity.

The term "antigen of avian egg drop syndrome virus" refers to any composition that contains at least one form of antigen of avian egg drop syndrome virus which can induce, stimulate or enhance an immune response against infection of avian egg drop syndrome virus, the forms of the antigen include but are not limited to inactivated, attenuated or subunit antigens.

The tFiber protein fragment antigen of avian egg drop syndrome virus of the disclosure may be prepared by recombined and expressed subunit antigen of the tFiber protein fragment, of which the expression system used may be eukaryotic expression systems or prokaryotic expression systems, or alternatively, the tFiber protein fragment antigen of avian egg drop syndrome virus may be synthetic peptide antigen artificially synthesized.

The "subunit antigen" refers to an antigen that is prepared by genetically engineering a protective antigen gene of a pathogen into a prokaryotic or eukaryotic expression system for efficient expression. It is less likely to cause side effects compared to the whole-virus antigens.

The "synthetic peptide antigen" refers to a small peptide that contains only a component of an immunological determinant, that is, an antigen that is prepared by synthesizing a protective short peptide according to the amino acid sequence of a natural protein by an artificial method, linking this protective short peptide with a vector, and adding an adjuvant.

The "live vectors" refers to non-pathogenic microorganisms, which carry and express a gene of an antigen or antigenic determinant by mean of genetic engineering as to produce immunogenicity. The non-pathogenic microorganisms may be bacteria and viruses, viruses that are often used as viral live vectors include vaccinia virus, fowlpox virus, turkey herpes virus, adenovirus, pseudorabies virus, retrovirus, lentivirus; bacterial live vectors may include attenuated *Salmonella*, BCG, attenuated *Listeria monocytogenes*, attenuated *Vibrio cholerae*, attenuated *Shigella*, *Lactococcus lactis*, *Lactobacillus plantarum*, and *Streptococcus gordonii*.

As an embodiment of the present disclosure, the tFiber protein fragment of avian egg drop syndrome virus in the vaccine composition is a protein encoded by a nucleotide sequence shown in SEQ ID NO. 2.

As an embodiment of the present disclosure, the gene that encodes the tFiber protein fragment of avian egg drop syndrome virus in the vaccine composition of the present disclosure has a nucleotide sequence shown in SEQ ID NO. 2 or a degenerate sequence thereof.

As an embodiment of the present disclosure, the content of the tFiber protein fragment of avian egg drop syndrome virus in the vaccine composition of the present disclosure is indicated as AGP titer equal to or greater than 1:8.

As a preferred embodiment of the present disclosure, the content of the tFiber protein fragment of avian egg drop syndrome virus in the vaccine composition of the present disclosure is indicated as AGP titer within a range of 1:8-1:32.

"AGP titer" refers to "Agar Gel Precipitation (test) titer)". Agar gel precipitation test is a precipitation reaction. Antigens and antibodies can diffuse freely in all direction in the agar gel containing electrolytes. The two combine with each other, and a precipitation line appears at the optimum ratio. The highest dilution ratio at which the precipitation line appears is the titer value, that is, the standard antigen or antibody content.

The term "pharmaceutically acceptable carrier" refers to all components other than the antigen of avian egg drop syndrome virus in the vaccine composition of the present disclosure which are carriers or diluents that do not cause significant irritation to an organism and do not abrogate the biological activity and properties of the administered compounds, preferably an adjuvant.

The vaccine composition of the disclosure may further be added with other reagents.

As an embodiment of the present disclosure, the pharmaceutically acceptable carrier includes drugs, immunostimulants, antioxidants, surfactants, colorants, volatile oils, buffers, dispersants, propellants and preservatives; the immunostimulants include α-interferon, β-interferon, γ-interferon, granulocyte-macrophage colony stimulating factor (GM-CSF), macrophage colony stimulating factor (M-CSF) and interleukin 2 (IL2).

Preferably, the immunostimulants comprise α-interferon, β-interferon, γ-interferon, granulocyte-macrophage colony stimulating factor (GM-CSF), macrophage colony stimulating factor (M-CSF) and interleukin 2 (IL2).

Methods well known in the art can be used to prepare such composition.

As an embodiment of the present disclosure, the pharmaceutically acceptable carrier in the vaccine composition of the present disclosure is adjuvant, the adjuvant may include one or more of: (1) mineral oil, alhydrogel adjuvant, saponins, Avridine, DDA; (2) water-in-oil emulsion, oil-in-water emulsion, water-in-oil-in-water emulsion; or (3) the polymers of acrylic or methaciylic acid, the copolymers of maleic anhydride and alkenyl derivative; and the RIBI adjuvant system, Block co-polymer, SAF-M, monophosphoryl lipid A, Avridine lipid-amine adjuvant, heat-labile enterotoxin from E. coli, cholera toxin, IMS 1314, muramyl dipeptide, Montanide ISA 206, Gel adjuvants; Preferably, the saponin is Quil A, QS-21, or GPI-0100;

The content of the adjuvant ranges from 5% to 70% V/V, preferably from 30% to 70% V/V, more preferably 66% V/V.

The term "adjuvant" may include a compound selected from a group consisting of alhydrogel adjuvant, saponins e.g., Quil A. QS-21 (Cambridge Biotech Inc., Cambridge Mass.), GPI-0100 (Galenica Pharmaceuticals, Inc., Birmingham, Ala.), water-in-oil emulsion, oil-in-water emulsion, water-in-oil-in-water emulsion, the polymers of acrylic or methaciylic acid and the copolymers of maleic anhydride and alkenyl derivative. The term "emulsion" may be based in particular on light liquid paraffin oil (European Pharmacopea type); isoprenoid oil, such as squalane or squalene oil, resulting from the oligomerization of alkenes, in particular of isobutene or decene; esters of acids or of alcohols containing a linear alkyl group, more particularly plant oils, ethyl oleate, propylene glycol di-(caprylate/caprate), glyceryl tri-(caprylate/caprate) or propylene glycol dioleate; esters of branched fatty acids or alcohols, in particular isostearic acid esters. The oil is used in combination with emulsifiers to form the emulsion. The emulsifiers are preferably nonionic surfactants, in particular esters of sorbitan, of mannide (e.g. anhydromannitol oleate), of aliphatic glycol, of polyglycerol, of propylene glycol and of oleic, isostearic, ricinoleic or hydroxy-stearic acids, which are optionally ethoxylated, and polyoxypropylene-polyoxyethylene block copolymers, in particular the Pluronic products, especially L121. See Hunter et al., The Theory and Practical Application of Adjuvants (Ed. Stewart-Tull, D. E. S). John Wiley and Sons, NY, pp 51-94 (1995) and Todd et al. Vaccine 15:564-570 (1997). For example, it is possible to use the SPT emulsion described on page 147 of "Vaccine Design, The Subunit and Adjuvant Approach" edited by M. Powell and M. Newman, Plenum Press, 1995, and the emulsion MF59 described on page 183 of the same book. The term "polymers of acrylic or methacrylic acid" preferably are the polymers of acrylic or methacrylic acid which are cross-linked, especially with polyalkenyl ethers of sugars or polyalcohols. These compounds are known by the term carbomer (Trade name, Carbopol) (Phameuropa Vol. 8, No. 2, June 1996). Persons skilled in the art can also refer to U.S. Pat. No. 2,909,462 which describes such acrylic polymers cross-linked with a polyhydroxylated compounds having at least 3 hydroxyl groups, preferably not more than 8, the hydrogen atoms of at least three hydroxyls being replaced by unsaturated aliphatic radicals having at least 2 carbon atoms. The preferred radicals are those containing 2 to 4 carbon atoms, e.g. vinyls, allyls and other ethylenically unsaturated groups. The unsaturated radicals themselves may contain other substituents, such as the methyl group. The products sold under the name CARBOPOL® (BF Goodrich, Ohio. USA) are particularly appropriate. They are cross-linked with allyl sucrose or with allyl pentaerythritol. Among them, there may be mentioned Carbopol 974P, 934P and 971 P, most preferably Carbopol 971P. For the term "copolymers of maleic anhydride and alkenyl derivative", EMA (Monsanto), which is the copolymer of maleic anhydride and ethylene, can also be considered. The dissolution of these polymers in water leads to an acid solution that will be neutralized, preferably to physiological pH, in order to give the adjuvant solution, into which the immunogenic, immunological or vaccine composition itself will be incorporated. The term "adjuvant" includes, but is not limited to, the RIBI adjuvant system (Ribi Inc.), Block co-polymer (CytRx, Atlanta Ga.), SAF-M (Chiron, Emeryville Calif.), monophosphoryl lipid A, Avridine lipid-amine adjuvant, heat-labile enterotoxin from E. coli (recombinant or otherwise), cholera toxin, IMS 1314, muramyl dipeptide, and Gel adjuvant among many others. Preferably, the adjuvant includes one or more of alhydrogel adjuvant, saponins, water-in-oil emulsion, oil-in-water emulsion, water-in-oil-in-water emulsion, the polymers of acrylic or methaciylic acid, the copolymers of maleic anhydride and alkenyl derivative, the RIBI adjuvant system, Block co-polymer, SAF-M, monophosphoryl lipid A, Avridine lipid-amine adjuvant, heat-labile enterotoxin from E. coli, cholera toxin, IMS 1314, muramyl dipeptide and Gel adjuvant.

As an embodiment of the present disclosure, the pharmaceutically acceptable carrier includes an adjuvant, which includes one or more of (1) alhydrogel adjuvant, saponins, Avridine, DDA; (2) water-in-oil emulsion, oil-in-water emulsion, water-in-oil-in-water emulsion; or (3) the polymers of acrylic or methaciylic acid, the copolymers of maleic anhydride and alkenyl derivative; and the RIBI adjuvant system, Block co-polymer, SAF-M, monophosphoryl lipid A, Avridine lipid-amine adjuvant, heat-labile enterotoxin from *E. coli*, cholera toxin, IMS 1314, muramyl dipeptide and Gel adjuvants;

Preferably, the saponin is Quil A, QS-21 or GPI-0100;

Preferably, the emulsions are SPT emulsion and MF59 emulsion, or the emulsions are formed by combination of oil and emulsifiers, the emulsions can be based in particular on light liquid paraffin oil; isoprenoid oil such as squalane or squalene oil resulting from the oligomerization of alkenes, in particular of isobutene or decene; esters of acids or of alcohols containing a linear alkyl group, more particularly plant oils, ethyl oleate, propylene glycol di-(caprylate/caprate), glyceryl tri-(caprylate/caprate) or propylene glycol dioleate; esters of branched fatty acids or alcohols, in particular isostearic acid esters; the emulsifiers are nonionic surfactants, in particular esters of polyoxyethylene fatty acid (e.g. oleic acid), of sorbitan, of mannide (e.g. anhydromannitol oleate), of glycol, of polyglycerol, of propylene glycol and of oleic, isostearic, ricinoleic or hydroxy-stearic acid, which are optionally ethoxylated, ethers of fatty alcohols and polyhydric alcohols (e.g. oleyl alcohol) and polyoxypropylene-polyoxyethylene block copolymers, in particular the Pluronic®, especially L121;

Preferably, the polymers of acrylic or methacrylic acid are compounds known by carbomer, in which the polymers of acrylic or methacrylic acid are cross-linked, especially with polyalkenyl ethers of sugars or polyalcohols, preferably, Carbopol 974P, 934P or 971P;

Preferably, the copolymers of maleic anhydride and alkenyl derivative are copolymers EMA of maleic anhydride and ethylene;

Preferably, the adjuvant is a mineral oil adjuvant for preparation of water-in-oil emulsion;

The concentration of the adjuvant ranges from 5% to 70% V/V, preferably from 30% to 70% V/V, more preferably 66% V/V;

White oil also refers to paraffin oil, white color oil, mineral oil. White oil is a widely used adjuvant in inactivated vaccines for delaying the retention time of immunogens in the body, so that the immunogens continuously and slowly release to enhance phagocytosis and bactericidal ability of macrophages.

The tFiber protein fragment of avian egg drop syndrome virus according to the present disclosure can also be applied to the development of expression vectors, nucleic acid vaccines, diagnostic reagents, and other drugs for preventing and/or treating the avian egg drop syndrome.

The present disclosure relates to a recombinant vector capable of expressing the tFiber protein fragment encoded by the nucleotide sequence according to the present disclosure, which is immunogenic and capable of producing an immune response.

The present disclosure relates to a transformant containing a recombinant vector with the introduced tFiber protein fragment according to the present disclosure.

As an embodiment of the present disclosure, the live vector in the vaccine composition of the present disclosure is recombinant attenuated *Salmonella*, recombinant Newcastle disease virus or recombinant poxvirus.

Because the live vector vaccine composition of the present disclosure combines the advantages of an inactivated vaccine and a live vaccine, it can ensure that the laying fowls can be protected in terms of the immunological efficacy, and immunological efficacy of the live vector vaccine composition is so strong that adjuvants may not be added.

The vaccine composition according to the present disclosure further comprises a combination of other pathogens or antigens to prepare a combined vaccine or a complex vaccine against infection of various diseases including avian egg drop syndrome virus.

The term "combined vaccine" refers to a vaccine prepared with the virus mixture by mixing the EDSV in the present disclosure with at least one other different virus. The term "complex vaccine" refers to a vaccine prepared from EDSV and bacterium. For example, the EDSV in the present disclosure may be mixed or combined with Newcastle disease virus, avian infectious bronchitis virus, avian influenza virus, infectious bursal disease virus, fowl adenovirus, avian reovirus and/or *Escherichia coli*, *Avibacterium paragallinarum*, *Mycoplasma synoviae* and *Mycoplasma gallisepticum*.

As an embodiment of the present disclosure, the vaccine composition further comprises one or more of the antigens selected from the group consisting of an antigen of Newcastle disease virus, an antigen of avian influenza virus, an antigen of avian infectious bronchitis virus, an antigen of infectious bursal disease, an antigen of fowl adenovirus, an antigen of avian reovirus, an antigen of *Escherichia coli*, an antigen of *Avibacterium paragallinarum*, an antigen of *Mycoplasma synoviae*, an antigen of *Mycoplasma gallisepticum*, an antigen of *Pasteurella multocida*, an antigen of Marek's disease virus, an antigen of avian encephalomyelitis virus and an antigen of infectious laryngotracheitis virus.

As a preferred embodiment of the present disclosure, the vaccine composition further comprises one or more of the antigens selected from the group consisting of an inactivated antigen of Newcastle disease virus, an inactivated antigen of avian influenza virus, an inactivated antigen of avian infectious bronchitis virus, a subunit antigen of infectious bursal disease virus, and an inactivated antigen or a subunit antigen of fowl adenovirus.

Using the highly effectively expressed tFiber protein fragment of the avian egg drop syndrome virus in the present disclosure, a five-combined vaccine was creatively prepared for the first time. After immunization, the immunized animal body can quickly produce a variety of antibodies so as to achieve a good prevention and control effect against a variety of diseases including avian egg drop syndrome virus infection.

As a more preferred embodiment of the present disclosure, in the vaccine composition of the present disclosure, the inactivated antigen of Newcastle disease virus is an inactivated antigen of N7a strain, the inactivated antigen of avian influenza virus is inactivated antigens of HF strain, the inactivated antigen of avian infectious bronchitis virus is inactivated antigen of M41 strain, the subunit antigen of infectious bursal disease virus is VP2 protein of infectious bursal disease virus, the inactivated antigen of fowl adenovirus is inactivated antigens of FAV-HN strain, and the subunit antigen of fowl adenovirus is Penton protein or Fiber-2 protein of the fowl adenovirus.

As a preferred embodiment of the present disclosure, in the vaccine composition of the present disclosure, the content of tFiber protein fragment of the egg drop syndrome virus is 1:8~1:32 of AGP titer, the content of the inactivated antigen of the Newcastle disease virus is $10^{8.0}$-$10^{9.0}$EID$_{50}$/0.1 ml before inactivation, the content of the inactivated antigen of the avian influenza virus is $10^{6.5}$-$10^{8.5}$ EID$_{50}$/0.1 ml before inactivation, the content of the inactivated antigen of the avian infectious bronchitis virus is $10^{6.0}$-$10^{7.0}$ $EID_{50}$/0.1 ml before inactivation, and the content of the VP2 protein of the avian infectious bursal disease virus is 1:16~1:128 of AGP titer, the content of the Penton protein of the fowl adenovirus is 1:2~1:16 of AGP titer, and the content of the Fiber-2 protein of the fowl adenovirus is 1:2~1:16 of AGP titer.

As a more preferred embodiment of the present disclosure, in the vaccine composition of the present disclosure, the content of tFiber protein fragment of the avian egg drop syndrome virus is 1:8~1:32 of AGP titer, the content of the inactivated antigen of the Newcastle disease virus is $10^{8.0}EID_{50}$/0.1 ml before inactivation, the content of the inactivated antigen of the avian influenza virus is $10^{8.0}$ $EID_{50}$/0.1 ml before inactivation, the content of the inactivated antigen of the avian infectious bronchitis virus is $10^{6.0}$ $EID_{50}$/0.1 ml before inactivation, and the content of the VP2 protein of the avian infectious bursal disease virus is 1:16 of AGP titer, the content of the Penton protein of the fowl adenovirus is 1:4 of AGP titer, and the content of the Fiber-2 protein of the fowl adenovirus is 1:4 of AGP titer.

The tFiber protein fragment of the disclosure may be prepared by any method known in the art, for example by recombinant expression of the gene of tFiber protein fragment, the expression system used may be any known expression system, for example: eukaryotic expression systems, or prokaryotic expression systems. Alternatively, the sequence of tFiber protein fragment may be synthesized directly. The eukaryotic expression systems can include mammalian cell expression systems, yeast expression systems, and insect expression systems.

The present disclosure also relates to a method for preparing said vaccine composition, wherein said method comprises: step (1), cloning a gene of the tFiber protein fragment of the avian egg drop syndrome virus and recombining the gene of the tFiber protein fragment of the avian egg drop syndrome virus into an expression vector so as to obtain a recombinant expression vector recombined with the gene of the tFiber protein fragment of the avian egg drop syndrome virus; step (2), transforming the recombinant expression vector recombined with the gene of the tFiber protein fragment of the avian egg drop syndrome virus and an expression vector of a molecular chaperone into *Escherichia coli* in order to express the tFiber protein fragment of the avian egg drop syndrome virus; step (3), treating the expressed tFiber protein fragment of the avian egg drop syndrome virus with a non-ionic surfactant in order to remove endotoxin; and step (4), mixing the tFiber protein fragment of the avian egg drop syndrome virus in which the endotoxin is removed with an adjuvant to obtain the vaccine composition.

Based on the finding that Fiber protein, which is present in a very little amount on the surface of capsid particles of avian egg drop syndrome virus, has good immunogenicity and low expression level. The present disclosure further studies the Fiber protein. The present disclosure has found that the subunit antigens prepared from the tFiber fragment of the Fiber protein, or the live vector recombined with the gene of the fragment can also produce good immunological efficacy after immunization, and surprisingly, the expression level is greatly increased. The preparation method of the present disclosure can significantly improve the expression of the tFiber protein fragment, and is cost-effective.

As an embodiment of the present disclosure, in the preparation method of the vaccine composition, in the method for preparing the vaccine composition, the recombinant expression vector recombined with the gene of the tFiber protein fragment of the avian egg drop syndrome virus in the step (1) is a recombinant pET28a plasmid, the expression vector of the molecular chaperone in the step (2) is pG-Tf2, the *Escherichia coli* in the step (2) is *Escherichia coli* BL21 (DE3); the nonionic surfactant in the step (3) is Triton X-114.

The disclosure also relates to a use of the vaccine composition in preparing a medicament for treatment and/or prevention of avian egg drop syndrome.

The disclosure also relates to a use of the vaccine composition in preparing a medicament for treatment and/or prevention of infection of avian egg drop syndrome virus.

Subjects that may be administered with the medicament for treatment and/or prevention of infection of avian egg drop syndrome virus according to the present disclosure include chickens or ducks.

The term "prevention and/or treatment", when relating to infection of avian egg drop syndrome virus, refers to inhibition of replication and spread of the avian egg drop syndrome virus or prevention of the avian egg drop syndrome virus from colonizing its host, and alleviation of disease or symptoms of illness by infection of the avian egg drop syndrome virus. If the viral load is reduced, the severity of the illness is reduced, and/or the food intake and/or growth are increased, then it can be considered that the treatment has achieved a therapeutic effect.

The description of the present disclosure is further provided as follows with reference to the specific embodiments, and features and advantages of the present disclosure will become more apparent from the following description. However, these embodiments are only exemplary, but not forming any limitation to the scope of the present disclosure. It should be understood by a person skilled in the art that modifications or alternatives to details and forms of the technical solution of the present disclosure without deviation from the spirit and scope of the present disclosure will be allowed, while those modification and alternatives should all fall within the scope of the present disclosure.

The chemical reagents used in the examples of the present disclosure are of analytical grade and are purchased from Sinopharm Group Co. Ltd. The experimental methods described in the present disclosure are conventional methods unless otherwise specified. The biological materials are commercially available unless otherwise specified.

Example 1 Construction of Expression Vector of pET28a-EDSV-tFiber 1.1 Extraction of EDSV DNA According to the instruction of the viral DNA extraction kit, 0.2 ml of SPF duck Embryo allantoic fluid infected by Strain HX of avian Egg Drop Syndrome Virus (deposited on Jun. 19, 2019 with an accession number CCTCC NO: V201942, and a deposition address is Wuhan University, Wuhan, China) was placed in a 1.5 ml sterile centrifuge tube, and add 0.4 ml of VB into the sample solution, mixed well by vortexing, and let stand at room temperature for 10 minutes. 0.45 ml of AD buffer was added into the above sample solution and mixed strongly. The VB column was placed in a 2 ml collection tube and 0.6 ml of the mixture was added to the VB column, which was then centrifuged at 14,000 g for 1 minute. The remaining mixture was added to the VB column, which was then centrifuged at 14,000 g for 1 minute, the 2 ml collection tube was discarded and the VB column was placed into a new 2 ml collection tube. Added 0.4 ml of W1 buffer, centrifuged at 14000 g for 30 seconds, added 0.6 ml Wash buffer in VB column, centrifuged at 14000 g for 30 seconds and centrifuged without adding any buffer for 3 minutes. The VB column is placed into a new 1.5 ml centrifuge tube. 50 µl RNase free water was added to the center of membrane and let sit for 3 minute, centrifuged at 14000 g for 1 minute, and the centrifuged liquid was virus DNA solution.

1.2 Amplification of Fiber Protein Gene

Oligonucleotide primers were synthesized based on the conserved region sequences at the 5' and 3' ends of the gene of the Fiber protein and PCR was made. Primer sequences are shown in Table 1.

TABLE 1

Primers for amplification of the Fiber protein gene

| | |
|---|---|
| Fiber-F | ATGAAGCGACTACGGTTGGA |
| Fiber-R | CTACTGTGCTCCAACATATG |

The PCR product was sent to Invitrogen Corporation for sequencing, and codon optimization was performed to the Fiber protein gene according to the sequencing result, the sequence of the optimized gene of the Fiber protein is shown in SEQ ID NO. 1.

1.3 Construction of Expression Vector

The optimized gene of the Fiber protein was sent to GENEWIZ, Inc. for full sequence synthesis, and pUC57-EDSV-Fiber plasmid containing a sequence of the condon-optimized Fiber gene was obtained.

Design and synthesize oligonucleotide primers according to the optimized Fiber sequence to amplify the tFiber gene. The primer sequences are shown in Table 2.

TABLE 2

Primers for amplification of the gene of the tFiber protein fragment

| | |
|---|---|
| tFiber-F | CATGCCATGGGCCCGCTGTCTATCACCTCT |
| tFiber-R | CCGCTCGAGTTACTGAGCACCAACGTA |

The PCR product was sent to Invitrogen Corporation for sequencing, the sequence of the gene of the tFiber protein fragment is shown in SEQ ID NO. 2. After electrophoresis, a DNA gel recovery kit was used for purification. The obtained DNA fragment was digested with Nco I and Xho I and then ligated with the pET-28a(+) plasmid treated by the same double digestion. The ligation product was transformed into E. coli DH5α competent cells, and positive clones were screened. The plasmid was extracted using a plasmid extraction kit and identified by double digestion. The correct plasmid identified by double digestion was sequenced and analyzed. The sequence-correct recombinant plasmid was named pET28a-EDSV-tFiber.

The pET28a-EDSV-Fiber plasmid was transformed into E. coli BL21 (DE3). The single clone was picked up and cultured in LB medium containing 100 µg/ml of kanamycin overnight, obtaining pET28a-EDSV-tFiber expression strain.

Example 2 Preparation of the tFiber Protein Fragment

The pET28a-EDSV-Fiber expression strain prepared in Example 1 was inoculated into LB medium containing 50-100 µg/ml of kanamycin at an inoculum amount of 1% (V/V), and cultured with shaking at 37° C. When $OD_{600}$=0.4-0.6, the sample was placed at 28° C. for 30 minutes. Isopropyl-β-D-thiogalactopyranoside (IPTG) was added at a final concentration of 0.1-1.0 mM and the sample was cultured with shaking at 28° C. for 24 hours. After cultivation, the bacteria were harvested and resuspended in PBS (sodium chloride, 8 g, potassium chloride, 0.2 g, disodium hydrogen phosphate, 1.44 g, potassium dihydrogen phosphate, 0.24 g, adjusted to pH 7.4 with a final volume of 1 L), centrifuged after ultrasonic disruption, and the supernatant was obtained. The expression product had a higher content of the soluble target protein, that is, the content of soluable tFiber protein fragment was high, the AGP titer of the tFiber protein fragment could reach up to 1:512, and the endotoxin had a content of $0.46 \times 10^5$ EU/ml, without HA activity.

Example 3 Clearance of Endotoxin in the tFiber Protein Fragment Expressed in E. coli 0.5 ml of the solution to be treated and Triton X-114 (5 µl) at a final concentration of 1% (v/v) were added to a 1.5 ml centrifuge tube and vortexed. The sample was placed on ice for 5 minutes. After vortexing the cooled sample, the centrifuge tube was immediately put in a 37° C. water bath for 5 min to create new two phases. Then, the sample was centrifuged at 37° C. for 60 seconds. After centrifugation, the target protein will remain in the upper layer, while the endotoxin-containing detergent will remain in the shape of an oil droplet at the bottom of the centrifuge tube. The entire operation for clearing endotoxin went through 3 cycles. It was measured that the AGP titer of the tFiber protein fragment reached 1:512, and the content of the endotoxin had been reduced into $0.009 \times 10^5$ EU/ml.

The results showed that Triton X-114 could eliminate the residual endotoxin in the recombinant protein and had no effect on the immunogenicity of the tFiber protein fragment.

Example 4 Preparation of Subunit Vaccine of the tFiber Protein Fragment of Avian Egg Drop Syndrome Virus The tFiber protein fragment purified according to the method of Example 3 was slowly added to the mineral oil adjuvant, while the motor was started to stir the mixture at 17500 r/min for 5 min. 1% thimerosal solution was added before termination of stirring to a final concentration of 0.01%. The component ratios are shown in Table 3.

TABLE 3

Component ratios of the subunit vaccine of the tFiber protein fragment of avian egg drop syndrome virus

| Component | Vaccine 1 | Vaccine 2 | Vaccine 3 |
|---|---|---|---|
| tFiber protein fragment (AGP titer) | 1:8 | 1:16 | 1:32 |
| mineral oil adjuvant (V/V%) | 66% | 66% | 66% |

Example 5 Immunogenicity Test of the Subunit Vaccine of the tFiber Protein Fragment of Avian Egg Drop Syndrome Virus on SPF Chicken 40 21-day-old SPF chicken were divided into 4 groups, that is to say, 10 chickens per group, the chickens in groups 1-3 were immunized by subcutaneous injection in necks with corresponding vaccines 1-3 prepared in Example 4, respectively, at an immune amount of 0.5 ml, and the chickens in group 4 were injected with 0.5 ml of physiological saline solution by subcutaneous injection, as a blank control. The chickens were fed in isolation. Before immunization and on the 21st day after immunization, blood sample was taken from each of the chickens and the corresponding serum was separated and the HI titer of the avian egg drop syndrome virus antibody (HI antibody titer) in each serum was measured. The results are shown in Table 4.

TABLE 4

Immunogenicity test results of the subunit vaccine of the tFiber protein fragment of avian egg drop syndrome virus on SPF Chicken

| Group | immune amount (ml per chicken) | Number of chickens | Results of HI antibody titer ($\log_2$) | |
|---|---|---|---|---|
| | | | Before immunization | 21 days after immunization |
| 1 | 0.5 | 10 | 0 | 10.5 |
| 2 | 0.5 | 10 | 0 | 10.8 |
| 3 | 0.5 | 10 | 0 | 11.0 |
| 4 | 0.5 | 10 | 0 | 0 |

The results showed that the HI antibody titer of the 4th group, i.e., the control group, on Day 21 after immunization was 0, while the $1^{st}$ to $3^{rd}$ groups, the immunization groups all had a high HI antibody titers in the immunized chickens. The results showed that the subunit vaccine of the tFiber protein fragment of egg drop syndrome virus with an AGP titer that was not less than 1:8 could produce high HI antibody titer and could achieve effective immune protection for chickens.

Example 6 Immunogenicity Test of the Subunit Vaccine of the tFiber Protein Fragment of Avian Egg Drop Syndrome Virus in Laying Hens 40 115-day-old Hy-Line Brown hens were divided into 4 groups, that is to say, 10 hens per group, the hens in groups 5-7 were immunized by subcutaneous injection in necks with corresponding vaccines 1-3 prepared in Example 4, respectively, at an immune amount of 0.5 ml, and the hens in group 8 were injected with 0.5 ml of physiological saline solution by subcutaneous injection, as a blank control. Before immunization and on the 21st day after immunization, blood sample was taken from each of the hens, the corresponding serum was separated, and HI titer of the avian egg drop syndrome virus antibody in each serum was measured. When the laying rate reached up to about 90% (6 weeks after immunization), all four groups of hens were challenged with virulent HX strains, each hen took 1 ml of 10-fold diluted virus solution orally, the virus content was $10^{6.5}$ $EID_{50}$, the hens were observed for 6 weeks after challenge with respect to feeding, spirit, stool and other conditions, the egg-laying numbers were recorded and the egg-laying rates were calculated. The results are shown in Table 5.

TABLE 5

Results of immunogenicity test of the subunit vaccine of the tFiber protein fragment of egg drop syndrome virus in layers

| Group | Immune dose (ml per hen) | Number of hens | Results of HI antibody titer ($\log_2$) | | Egg-laying rates | | |
|---|---|---|---|---|---|---|---|
| | | | Before immunization | On the 21st day after immunization | Before challenge | Week 3 after challenge | Week 6 after challenge |
| 5 | 0.5 | 10 | 0 | 10.2 | 89.2 | 90.6 | 90.9 |
| 6 | 0.5 | 10 | 0 | 10.5 | 91.4 | 90.4 | 91.1 |
| 7 | 0.5 | 10 | 0 | 10.8 | 90.2 | 91.6 | 90.4 |
| 8 | 0.5 | 10 | 0 | 0 | 90.1 | 46.5 | 69.6 |

The results showed that the HI antibody titer of the 8th group i.e. control group on the 21st day after immunization was 0, and the egg-laying rate of the hens in the control group decreased after challenge, and in the third week after challenge, the egg-laying rate dropped from about 90% to about 46%, while the shell color faded and soft-shell eggs, shell-less eggs and deformed eggs were laid; in the sixth week after challenge, the egg-laying rate was about 69%, but still was not back to a normal level. The immunized groups from group 5 to group 7 all had higher HI antibody titers in immunized hens, and there was almost no change in egg-laying rate after challenge, indicating that the hens immunized with the subunit vaccine of the tFiber protein fragment of egg drop syndrome virus having a AGP titer no less than 1:8, all produced high HI antibody titers. The antigens of tFiber protein fragment of the present disclosure had good immunogenicity and could provide effective immune protection for hens, even at a low content.

Example 7 Immunogenicity Test of the Subunit Vaccine of the tFiber Protein Fragment of Avian Egg Drop Syndrome Virus in Cherry Valley Ducks 40 42-day-old Cherry Valley ducks were divided into 4 groups, that is to say, 10 ducks per group, the ducks in groups 9-11 were immunized by subcutaneous injection in necks with corresponding vaccines 1-3 prepared in Example 4, respectively, at an immune amount of 0.5 ml, and the ducks in group 12 were injected with 0.5 ml of physiological saline solution by subcutaneous injection, as a blank control. All experimental ducks were fed in isolation. Before immunization and on the 21st day after immunization, blood sample was taken from each of the ducks, the corresponding serum was separated, and the HI titer of the avian egg drop syndrome virus antibody (HI antibody titer) in each serum was measured. The results are shown in Table 6.

TABLE 6

Results of immunogenicity test of the subunit vaccine of the tFiber protein fragment of avian egg drop syndrome virus in Cherry Valley ducks

| Group | Immune dose ml per duck | Number of ducks | Results of HI antibody titers ($\log_2$) | |
|---|---|---|---|---|
| | | | Before immunization | On the 21st day after immunization |
| 9 | 0.5 | 10 | 0 | 10.5 |
| 10 | 0.5 | 10 | 0 | 10.8 |
| 11 | 0.5 | 10 | 0 | 11.0 |
| 12 | 0.5 | 10 | 0 | 0 |

The results showed that the HI antibody titer in the 12th group, i.e. control group, on Day 21 after immunization was 0, while the immunization groups 9-11 all had a high HI antibody titer in the immunized ducks. The results showed that the subunit vaccine of the tFiber protein fragment of avian egg drop syndrome virus with an AGP tier that is not less than 1:8 could produce high HI antibody titer. The antigens of tFiber protein fragment of the present disclosure had good immunogenicity and could provide effective immune protection for ducks, even at a low content.

Example 8 Preparation of Subunit Vaccine of the Fiber Protein of Avian Egg Drop Syndrome Virus The pET28a-EDSV-Fiber expression strain was constructed according to the method in Example 1, and the full-length Fiber protein was prepared according to the method in Example 2. The HA titer of the Fiber protein was 1:152, the AGP titer was 1:64, and the endotoxin content was $0.51 \times 10^5$ EU/ml. The endotoxin was removed according to the method of Example 3. It was determined that the AGP titer of Fiber protein reached up to 1:64, and the endotoxin content was decreased to $0.009 \times 10^5$ EU/ml.

The purified Fiber protein was slowly added to the mineral oil adjuvant, while the motor was started to stir the mixture at 17500 r/min for 5 min. 1% thimerosal solution was added before termination of stirring to a final concentration of 0.01%. The component ratios are shown in Table 7.

TABLE 7

Component ratios of the subunit vaccine of the Fiber protein of avian egg drop syndrome virus

| Component | Vaccine 4 |
|---|---|
| Fiber protein (AGP titer) | 1:16 |
| Mineral oil adjuvant (V/V%) | 66% |

Example 9 Contrastive Experiments of Durations of Immunity of Subunit Vaccines of Avian Egg Drop Syndrome Virus 30 21-day-old SPF chickens were divided into 3 groups, that is to say, 10 chickens per group, the chickens in groups 13-14 immunized by subcutaneous injection in necks with vaccine 2 prepared in Example 4 and vaccine 4 prepared in Example 8, respectively, at an immune amount of 0.5 ml, and the chickens in group 15 were injected with 0.5 ml of physiological saline solution by subcutaneous injection, as a blank control. All experimental chickens were fed in isolation. Before immunization and on the 21st day after immunization, blood sample was taken from each of the chickens, the corresponding serum was separated, and the HI titer of the avian egg drop syndrome virus antibody in each serum was measured. The results are shown in Table 8.

TABLE 8

Results of contrastive experiments of durations of immunity of subunit vaccines

| time after immunization | Results of HI antibody titers ($\log_2$) | | |
|---|---|---|---|
| | Group 13 | Group 14 | Group 15 |
| 14 days | 9.6 | 8.8 | 0 |
| 21 days | 10.8 | 9.5 | 0 |
| 28 days | 12.0 | 10.2 | 0 |
| 35 days | 11.5 | 9.8 | 0 |
| 42 days | 11.2 | 9.7 | 0 |
| 2 months | 10.8 | 9.0 | 0 |
| 3 months | 10.8 | 8.8 | 0 |
| 4 months | 10.2 | 8.2 | 0 |
| 5 months | 9.8 | 7.7 | 0 |
| 6 months | 9.5 | 7.5 | 0 |

The results showed that the HI antibody titer in the 15th group after immunization was 0; the 13th group had a high HI antibody titer in the immunized chickens, which HI antibody titer can be maintained high within 6 months after immunization; the 14th group also had a high HI antibody titer in the immunized chickens, which HI antibody titer is lower than that of the 13th group. The results showed that the subunit vaccine of tFiber protein fragment of avian egg drop syndrome virus had better immunogenicity than the subunit vaccine of full-length Fiber protein of avian egg drop syndrome virus. That is, the subunit vaccine of tFiber protein fragment of avian egg drop syndrome virus can make the chickens maintain the HI antibody titer for a longer time, and can provide long-term and effective immune protection to the chickens.

Example 10 Preparation of Antigens of Newcastle Disease Virus

Newcastle disease virus (genotype VII), N7 strain deposited in China Center for Type Culture Collection on Oct. 19, 2015 with an accession number CCTCC NO: V201545 and a deposition address that is Wuhan University, Wuhan, China, disclosed in Chinese patent application CN107281479 A, was diluted appropriately ($10^{-4}$ or $10^{-5}$) with sterile saline so as to inoculate susceptible chicken embryos which are 10-11 days old at 0.1 ml per embryo, and the chicken embryos were placed at 37° C. after inoculation for subsequent incubation. Allantoic fluid was harvested from chicken embryos which were died within 48~120 hours after inoculation or still survived, the virus content determined was $10^{8.0}EID_{50}/0.1$ ml. Formaldehyde solution with a final concentration of 0.1% (v/v) was added into the sample which is then placed at 37° C. to be inactivated, and stirred once every 4-6 hours during the process, and stored after 16 hours of complete inactivation.

Example 11 Preparation of Antigens of Avian Influenza Virus

H9 subtype of avian influenza virus HF strain (Avian Influenza Virus (Subtype H9), Strain HF, deposited on Jun. 19, 2019 with an accession number CCTCC NO: V201941 and a deposition address that is Wuhan University, Wuhan, China,) was picked as a virus species and diluted with sterile saline to $10^{-3}$ (0.1 ml of virus solution was added to 0.9 ml sterile saline, and then diluted 2 more times after shaking and mixing). The diluted virus solution was inoculated into 10-day-old susceptible chicken embryos (hatched from SPF hatching eggs purchased from Beijing Meiliyaweitong Experimental Animal Technology Co., Ltd) via the allantoic cavity at 0.1 ml (containing $10^5 EID_{50}$) per embryo. The pinhole was sealed after inoculation, and the chicken embryos were placed at 36-37° C. for subsequent incubation. It was not necessary to turn over the chicken eggs. After 96 hours, the chicken embryos were removed with upward gas chambers, and cooled at 2-8° C. for 12-24 hours. Allantoic fluid was harvested from the cooled chicken embryos. The virus content determined was $10^{8.5} EID_{50}/0.1$ ml. Formaldehyde solution with a final concentration of 0.1% (v/v) was added into the sample, which is then placed at 37° C. to be inactivated, and stirred once every 4-6 hours during the process, and stored after 24 hours of complete inactivation.

Example 12 Preparation of Antigens of Avian Infectious Bronchitis Virus

Avian infectious bronchitis virus M41 strain (purchased from the China Veterinary Drug Administration) was diluted appropriately (to $10^{-2}$ or $10^{-3}$) with sterile saline so as to inoculate susceptible chicken embryos which are 10-11 days old at 0.1 ml per embryo, and the chicken embryos were placed at 36-37° C. after inoculation for subsequent incubation. Allantoic fluid was harvested from chicken embryos, which were died within 24 to 48 hours after inoculation or survived 24-48 hours after inoculation, the virus content determined was $10^{6.0}$ $EID_{50}/0.1$ ml. Formaldehyde solution with a final concentration of 0.1% (v/v) was added into the sample, which is then placed at 37° C. to be inactivated, and stirred once every 4-6 hours during the process, and stored after 16 hours of complete inactivation.

Example 13 Preparation of Antigens of Infectious Bursal Disease Virus (IBDV)

13.1 Preparation of VP2 cDNA

The IBDV RNA was extracted from the bursa of Fabricius of SPF chickens infected with super virulent IBDV Chengdu strain by virus RNA extraction kit and made reverse transcription with random primers. Oligonucleotide primers were synthesized based on the conserved region sequences at the 5' and 3' ends of the VP2 gene. The sequence of the synthesized oligonucleotide primers are shown in Table 9. PCR amplification was conducted, and the product was recovered by the agarose gel recovery kit and stored at −20° C.

TABLE 9

| Primers for amplification of IBDV VP2 gene | |
|---|---|
| VP2-EcoR1-F | CCGGAATTCATGACAAACCTGCAAGATCAAAC |
| VP2-Sal1-R | ACGCGTCGACTTACCTTAGGGCCCGGATTATGT |

13.2 Construction of pColdIII-VP2/E. coli BL21 (DE3) Strain

The VP2 cDNA prepared above was double-digested, and the digested fragment was ligated into the pCold III vector. The ligated product was directly transformed into E. coli BL21 (DE3) and spread on a solid LB medium containing 100 μg of ampicillin and cultured overnight, the colonies grew were the pColdIII-VP2/E. coli BL21 (DE3) strain.

13.3 Preparation of Infectious Bursal Disease Virus VP2 Protein

The strain was cultured in a culture tank with natural ventilation, which was filled with 70% culture medium and peanut oil defoamer according to the volume. After sterilization, the seed solution of pColdIII-VP2/E. coli BL21 (DE3) strain was inoculated at 2%-4% of the amount of culture medium and cultured at 37° C. 0.2 mol/L α-lactose was added in when the $OD_{600}$ value of the solution reached 0.6-1.0, so that its final concentration reached 0.02 mol/L, then the solution was cultured for 5-8 h.

After cultivation, the bacteria were collected by centrifugation, resuspended, ultrasonicated, and centrifuged to collect the supernatant. After precipitation with ammonium sulfate, VP2 protein liquid was collected.

The endotoxin was removed according to the method in Example 3. It was determined that the endotoxin content was decreased to 0.3 EU/ml.

Example 14 Preparation of Antigens of Fowl Adenovirus 14.1 Preparation of Fiber-2 cDNA FADV DNA was extracted from the FAV-HN strain of fowl aviadenovirus according to the manual of the virus RNA extraction kit. The FAV-HN strain (Fowl aviadenovirus, strain FAV-HN) has been deposited in the China Center for Type Culture Collection on Feb. 29, 2016, of which the accession number is CCTCC NO. V 201609 and the address is Wuhan University, Wuhan, China, and it was disclosed in Chinese patent application CN107523556A. Oligonucleotide primers were synthesized based on the conserved region sequences at the 5' and 3' ends of the Fiber-2 protein gene. The sequences of the synthesized oligonucleotide primers are shown in Table 10. PCR amplification was conducted, and the product was recovered by the agarose gel recovery kit and stored at −20° C.

TABLE 10

| Primers for amplification of gene of the Fiber-2 protein of Fowl aviadenovirus | |
|---|---|
| Fiber-2-F | CTCCGGGCCCCTAAAAG |
| Fiber-2-R | CGGGACGGAGGCCGC |

14.2 Construction of Expression Vector

The optimized Fiber-2 protein gene was sent to GENEWIZ, Inc. for full sequence synthesis and linked into pET28a plasmid respectively. The linked plasmid was transformed into E. coli BL21 (DE3). The single clone was picked up and cultured in LB medium containing 100 μg of kanamycin overnight. The plasmid was extracted and sequenced. The positive clone was pET28a-FADV-Fiber-2 expression strain.

14.3 Preparation of Fiber-2 Protein

The pET28a-FADV-Fiber-2/E. coli BL21(DE3) strain prepared in above Example was inoculated into LB medium containing 50-100 μg/ml of kanamycin at an inoculum amount of 1% (V/V), and cultured with shaking at 37° C. When OD600=0.4-0.6, the sample was placed at 28° C. for 30 minutes. Isopropyl-β-D-thiogalactopyranoside (IPTG) was added to a final concentration of 0.1 mM, and the sample was cultured with shaking at 28° C. for 24 hours.

After cultivation, the bacteria were harvested and resuspended in PBS (sodium chloride 8 g, potassium chloride 0.2 g, disodium hydrogen phosphate 1.44 g, potassium dihydrogen phosphate 0.24 g, adjusted to pH 7.4 with a final volume of 1 L), centrifuged after ultrasonic disruption and the supernatant was obtained. The Fiber-2 protein solution was collected.

The endotoxin was removed according to the method in Example 3. It was determined that the endotoxin content was decreased to $0.008 \times 10^5$ EU/ml.

Example 15 Preparation of Combined Vaccine of Avian Egg Drop Syndrome Virus

The purified antigen of tFiber protein fragment of EDSV according to Example 3 was mixed with antigen of Newcastle disease virus prepared according to Example 10, antigen of avian influenza virus prepared according to Example 11, antigen of avian infectious bronchitis virus prepared according to Example 12, antigen of infectious bursal disease virus prepared according to Example 13, and antigen of fowl adenovirus prepared according to Example 14 in a certain ratio, respectively, and added to the mineral oil adjuvant, while the motor was started to stir the mixture at 17500 r/min for 5 min. 1% thimerosal solution was added before termination of stirring to a final concentration of 0.01%. The component ratios are shown in Table 11, 12, 13 and 14.

TABLE 11

Component ratios of bivalent vaccine of avian egg drop syndrome virus

| Component | Vaccine 5 | Vaccine 6 | Vaccine 7 | Vaccine 8 | Vaccine 9 |
|---|---|---|---|---|---|
| tFiber protein fragment (AGP titer) | 1:8 | 1:16 | 1:32 | 1:8 | 1:16 |
| Antigen of N7a strain ($EID_{50}$/0.1 ml) | $10^{8.0}$ | — | — | — | — |
| Antigen of HF strain ($EID_{50}$/0.1 ml) | — | $10^{8.0}$ | — | — | — |
| Antigen of M41 strain ($EID_{50}$/0.1 ml) | — | — | $10^{6.0}$ | — | — |
| VP2 protein (AGP titer) | — | — | — | 1:16 | — |
| Fiber-2 protein (AGP titer) | — | — | — | — | 1:4 |
| Mineral oil adjuvant (V/V%) | 66% | 66% | 66% | 66% | 66% |

TABLE 12

Component ratios of trivalent vaccine of avian egg drop syndrome virus

| Component | Vaccine 10 | Vaccine 11 | Vaccine 12 | Vaccine 13 |
|---|---|---|---|---|
| tFiber protein fragment (AGP titer) | 1:32 | 1:8 | 1:16 | 1:32 |
| Antigen of N7a strain ($EID_{50}$/0.1 ml) | $10^{8.0}$ | $10^{8.0}$ | $10^{8.0}$ | $10^{8.0}$ |
| Antigen of HF strain ($EID_{50}$/0.1 ml) | $10^{8.0}$ | — | — | — |
| Antigen of M41 strain ($EID_{50}$/0.1 ml) | — | $10^{6.0}$ | — | — |
| VP2 protein (AGP titer) | — | — | 1:16 | — |
| Fiber-2 protein (AGP titer) | — | — | — | 1:4 |
| Mineral oil adjuvant (V/V%) | 66% | 66% | 66% | 66% |

TABLE 13

Component ratios of tetravalent vaccine of avian egg drop syndrome virus

| Component | Vaccine 14 | Vaccine 15 | Vaccine 16 | Vaccine 17 | Vaccine 18 |
|---|---|---|---|---|---|
| tFiber protein fragment (AGP titer) | 1:8 | 1:16 | 1:32 | 1:8 | 1:16 |
| Antigen of N7a strain ($EID_{50}$/0.1 ml) | $10^{8.0}$ | $10^{8.0}$ | $10^{8.0}$ | $10^{8.0}$ | $10^{8.0}$ |
| Antigen of HF strain ($EID_{50}$/0.1 ml) | $10^{8.0}$ | — | — | $10^{8.0}$ | $10^{8.0}$ |
| Antigen of M41 strain ($EID_{50}$/0.1 ml) | $10^{6.0}$ | $10^{6.0}$ | $10^{6.0}$ | — | — |
| VP2 protein (AGP titer) | — | 1:16 | — | 1:16 | — |
| Fiber-2 protein (AGP titer) | — | — | 1:4 | — | 1:4 |
| Mineral oil adjuvant (V/V%) | 66% | 66% | 66% | 66% | 66% |

TABLE 14

Component ratios of pentavalent vaccine of avian egg drop syndrome virus

| Component | Vaccine 19 | Vaccine 20 |
|---|---|---|
| tFiber protein fragment (AGP titer) | 1:16 | 1:16 |
| Antigen of N7a strain ($EID_{50}$/0.1 ml) | $10^{8.0}$ | $10^{8.0}$ |
| Antigen of HF strain ($EID_{50}$/0.1 ml) | $10^{8.0}$ | $10^{8.0}$ |
| Antigen of M41 strain ($EID_{50}$/0.1 ml) | $10^{6.0}$ | $10^{6.0}$ |
| VP2 protein (AGP titer) | 1:16 | — |
| Fiber-2 protein (AGP titer) | — | 1:4 |
| Mineral oil adjuvant (V/V%) | 66% | 66% |

Example 16 Immunogenicity Tests of the Combined Vaccines of Avian Egg Drop Syndrome Virus 16.1 Immunogenicity Test of Avian Egg Drop Syndrome Virus Part 170 21-day-old SPF chickens were divided into 17 groups, that is to say, 10 chickens per group, the chickens in groups 16-31 were immunized by subcutaneous injection in necks with corresponding vaccines 5-20 prepared in Example 15, respectively, at an immune amount of 0.5 ml, and the chickens in group 32 were injected with 0.5 ml of physiological saline by subcutaneous injection, as a blank control. All experimental chickens were fed in isolation. On the 21st day after immunization, blood sample was taken from each of the chickens, the corresponding serum was separated, and HI titer of the egg drop syndrome virus antibody for each serum was measured. The results are shown in Table 15.

TABLE 15

Results of immunogenicity tests of the avian egg drop syndrome virus part of the combined vaccines of avian egg drop syndrome virus

| | | | Results of HI antibody titers ($\log_2$) | |
|---|---|---|---|---|
| Group | Immune dose (ml per chicken) | Number of chickens | Before immunization | On the 21st day after immunization |
| 16 | 0.5 | 10 | 0 | 10.5 |
| 17 | 0.5 | 10 | 0 | 10.8 |
| 18 | 0.5 | 10 | 0 | 11.0 |
| 19 | 0.5 | 10 | 0 | 10.5 |

TABLE 15-continued

Results of immunogenicity tests of the avian egg drop syndrome virus part of the combined vaccines of avian egg drop syndrome virus

| | | | | Results of HI antibody titers ($\log_2$) |
|---|---|---|---|---|
| Group | Immune dose (ml per chicken) | Number of chickens | Before immunization | On the 21st day after immunization |
| 20 | 0.5 | 10 | 0 | 10.8 |
| 21 | 0.5 | 10 | 0 | 11.0 |
| 22 | 0.5 | 10 | 0 | 10.5 |
| 23 | 0.5 | 10 | 0 | 10.8 |
| 24 | 0.5 | 10 | 0 | 11.0 |
| 25 | 0.5 | 10 | 0 | 10.5 |
| 26 | 0.5 | 10 | 0 | 10.7 |
| 27 | 0.5 | 10 | 0 | 11.0 |
| 28 | 0.5 | 10 | 0 | 10.8 |

TABLE 15-continued

Results of immunogenicity tests of the avian egg drop syndrome virus part of the combined vaccines of avian egg drop syndrome virus

| | | | | Results of HI antibody titers ($\log_2$) |
|---|---|---|---|---|
| Group | Immune dose (ml per chicken) | Number of chickens | Before immunization | On the 21st day after immunization |
| 29 | 0.5 | 10 | 0 | 10.7 |
| 30 | 0.5 | 10 | 0 | 10.7 |
| 31 | 0.5 | 10 | 0 | 10.8 |
| 32 | 0.5 | 10 | 0 | 0 |

The results showed that the groups immunized with vaccines 5-20 produced high HI antibody titers on the 21st days after immunization, which could effectively prevent the outbreak of egg drop syndrome among chicken flocks. It is shown that the oil-emulsion combined vaccine, in which the tFiber protein fragment of avian egg drop syndrome virus provided by the present disclosure was prepared as an antigen, could provide complete protection for the chickens.

16.2 Immunogenicity Test of Newcastle Disease Virus Part 130 21-day-old SPF chickens were divided into 13 groups, that is to say, 10 chickens per group, the chickens in groups 33-44 were immunized by subcutaneous injection in necks with corresponding vaccine 5 and vaccines 10-20 prepared in Example 15, respectively, at an immune amount of 20 µl, and the chickens in group 45 were injected with 20 µl of physiological saline by subcutaneous injection, as a blank control of challenge. All the experimental chickens were fed in isolation. On the 21st day after immunization, the blood samples of the immunized chicken in groups 33-44 together with the chicken in the 45th group of control were collected, and the corresponding serums were separated. HI antibody titer of the Newcastle disease virus was measured, meanwhile the chicken were challenged by intramuscular injection of the virus solution of virulent Newcastle disease HN1101 strain, and then were observed for 14 days. The numbers of incidence and deaths and protection rates were recorded. The results are shown in Table 16.

TABLE 16

Results of immunogenicity test of the Newcastle disease virus part of the combined vaccine of avian egg drop syndrome virus

| | Immune | | Results of HI antibody titer ($\log_2$) | | Results of challenge | | |
|---|---|---|---|---|---|---|---|
| Group | dose (µl per chicken) | Number of chickens | Before immunization | Day 21 after immunization | Number of incidence | Number of deaths | Protection rate |
| 33 | 20 | 10 | 0 | 8.0 | 0/10 | 0/10 | 100% |
| 34 | 20 | 10 | 0 | 8.3 | 0/10 | 0/10 | 100% |
| 35 | 20 | 10 | 0 | 8.1 | 0/10 | 0/10 | 100% |
| 36 | 20 | 10 | 0 | 8.2 | 0/10 | 0/10 | 100% |
| 37 | 20 | 10 | 0 | 8.3 | 0/10 | 0/10 | 100% |
| 38 | 20 | 10 | 0 | 8.1 | 0/10 | 0/10 | 100% |
| 39 | 20 | 10 | 0 | 8.0 | 0/10 | 0/10 | 100% |
| 40 | 20 | 10 | 0 | 8.3 | 0/10 | 0/10 | 100% |
| 41 | 20 | 10 | 0 | 8.0 | 0/10 | 0/10 | 100% |
| 42 | 20 | 10 | 0 | 8.1 | 0/10 | 0/10 | 100% |
| 43 | 20 | 10 | 0 | 8.2 | 0/10 | 0/10 | 100% |
| 44 | 20 | 10 | 0 | 8.2 | 0/10 | 0/10 | 100% |
| 45 | 20 | 10 | 0 | 0 | 10/10 | 10/10 | 0 |

Note:
the HI antibody titer was determined as the geometric mean of the immunized chicken antibody titer The results showed that the groups immunized with vaccine 5 and vaccines 10-20 could all produce a high Newcastle antibody and compared with the control group, could provide complete protection against the virulent strain. It is shown that the oil-emulsion combined vaccine, in which the Newcastle disease virus N7a strain solution provided by the present disclosure was prepared as antigen, could provide complete protection for the chickens.

16.3 Immunogenicity Test of Avian Influenza Virus Part 80 21-day-old SPF chickens were divided into 8 groups, that is to say, 10 chickens per group, the chickens in groups 46-52 were immunized by subcutaneous injection in necks with corresponding vaccines 6, 10, 14, and 17-20 prepared in Example 15, respectively, at an immune amount of 0.3 ml per chicken, and the chickens in group 53 were injected with 0.3 ml of physiological saline by subcutaneous injection, as a blank control of challenge. All the experimental chickens were fed in isolation. On the 21st day after immunization, the blood samples of the immunized chicken in groups 46-52 together with the control chicken in the 53th group were collected, and the corresponding serums were separated. HI antibody titer of the H9 subtype of avian influenza virus was detected. Meanwhile the chickens were challenged by intravenous injection of the virus solution of HF strain at 0.2 ml (containing $10^{7.0}$ $EID_{50}$) per chicken. On the $5^{th}$ day after challenge, cloacal swabs were collected. 5 SPF chicken embryos of 10 to 11 days old were inoculated with the treated cloacal swab samples through the allantoic cavity. After incubating for 5 days, both dead embryos and live embryos should be assayed for hemagglutination (HA) titers of the chicken embryo solution. Among every five chicken embryos inoculated with one swab sample, as long as the hemagglutination titers of one chicken embryo solution was not less than 1:16 (micro-method), it could be determined as being positive virus isolation. The samples showing negative virus isolation should be re-determined after blind passage. There should be at least 9 chickens in the immunization groups showing negative virus isolation; and there should be at least 4 chickens in the control group showing positive virus isolation. The results are shown in Table 17.

TABLE 17

Results of immunogenicity test of the avian influenza virus part of the combined vaccine of avian egg drop syndrome virus

| | Immune | | Results of HI antibody titers (($log_2$) | | Results of challenge | |
|---|---|---|---|---|---|---|
| Group | dose (ml per chicken) | Number of chickens | Before immunization | Day 21 after immunization | isolation rate of virus | Protection rate |
| 46 | 0.3 | 10 | 0 | 9.3 | 0/10 | 100% |
| 47 | 0.3 | 10 | 0 | 9.2 | 0/10 | 100% |
| 48 | 0.3 | 10 | 0 | 9.1 | 0/10 | 100% |
| 49 | 0.3 | 10 | 0 | 9.2 | 0/10 | 100% |
| 50 | 0.3 | 10 | 0 | 9.3 | 0/10 | 100% |
| 51 | 0.3 | 10 | 0 | 9.3 | 0/10 | 100% |
| 52 | 0.3 | 10 | 0 | 9.3 | 0/10 | 100% |
| 53 | 0.3 | 10 | 0 | 0 | 10/10 | 0 |

Note:
the HI antibody titer was determined as the geometric mean of the immunized chicken antibody titer.

The results showed that the groups immunized with vaccines 6, 10, 14, and 17-20 could all produce a high avian influenza virus antibody on the 21st day after immunization and compared with the control group, could provide complete protection against the virulent strain. It is shown that the oil-emulsion combined vaccine, in which the avian influenza virus H9 subtype strain solution provided by the present disclosure was prepared as antigen, could provide complete protection for the chickens.

16.4 Immunogenicity Test of Avian Infectious Bronchitis Virus Part 80 21-day-old SPF chicken were divided into 8 groups, 10 chickens per group. The chickens in groups 54-60 were immunized by eye-drop and nose-drop inoculation with live vaccines (H120 strain) of avian infectious bronchitis, respectively, at an immune amount of 0.05 ml per chicken. On the 21st day after immunization, the blood samples of the immunized chicken in groups 54-60 together with the control chicken in the 61st group were collected, and the corresponding serums were separated. Meanwhile, the chickens in groups 54-60 were immunized by subcutaneous injection in necks with corresponding vaccines 7, 11, 14, 15, 16, 19, and 20 prepared in Example 15, respectively, at an immune amount of 0.3 ml per chicken. On the $28^{th}$ day after immunization, the blood samples of the immunized chicken in groups 54-60 together with the control chicken in the 61st group were collected and the corresponding serums were separated. The serum samples collected from the immunized chickens in groups 54-60 on the 21st day after first immunization of live vaccines and on the 28th day after immunization of inactivated vaccines (the serum samples were collected from the control chickens in group 61 at the same time) were detected for HI antibody titers. For the immunization groups, the geometric means of the HI antibody titers in the serums of second immunization were not less than 4 times of the geometric means the HI antibody titers in the serums of first immunization, and the geometric mean of the HI antibody titers in the non-immunization control group was not higher than 1:8 (micromethod). At the same time, the challenge experiment was conducted with virulent M41 strain of avian infectious bronchitis virus via nose-drop inoculation at $10^{3.0}$ $EID_{50}$ per chicken. The results are shown in Table 18.

TABLE 18

Results of immunogenicity test of the avian infectious bronchitis virus part of the combined vaccine of avian egg drop syndrome virus

| Group | Antibody titers for the first immunization | Antibody titers for the second immunization | Factors of antibody titers for the first immunization versus antibody titers for the second immunization | isolation rate of virus after challenge |
|---|---|---|---|---|
| 54 | 1:18.2 | 1:91.7 | 5.0 | 0/10 |
| 55 | 1:18.9 | 1:101.2 | 5.4 | 0/10 |
| 56 | 1:19.8 | 1:102.8 | 5.2 | 0/10 |
| 57 | 1:22.6 | 1:120.4 | 5.3 | 0/10 |
| 58 | 1:23.8 | 1:124.8 | 5.2 | 0/10 |
| 59 | 1:22.2 | 1:125.6 | 5.7 | 0/10 |
| 60 | 1:20.4 | 1:120.2 | 5.9 | 0/10 |
| 61 | ≤1:4 | ≤1:4 | — | 10/10 |

The results showed that the geometric means of the HI antibody titers in the serums of second immunization for vaccines 7, 11, 14, 15, 16, 19, and 20 were not less than 4 times of the geometric means of the HI antibody titers in the serums of first immunization, no virus was isolated from all of the tracheas of immunized chickens after challenge. The vaccines 7, 11, 14, 15, 16, 19, and 20 could provide complete protection against the virulent strain. It is shown that the oil-emulsion combined vaccine, in which the avian infectious bronchitis virus solution provided by the present disclosure was prepared as antigen, could provide complete protection for the chickens.

16.5 Immunogenicity Test of Avian Infectious Bursal Disease Virus Part 60 21-day-old SPF chickens were divided into 6 groups, that is to say, 10 chickens per group. The chickens in groups 62-66 were immunized by subcutaneous injection in necks with corresponding vaccines 8, 12, 15, 17, and 19 prepared in Example 15, respectively, at an immune amount of 0.3 ml per chicken, and the chickens in group 67 were injected with 0.3 ml of physiological saline by subcutaneous injection, as a blank control of challenge. All experimental chickens were fed in isolation. On the 21st day after immunization, the chickens in groups 62-67 were challenged by eye-drop inoculation with 0.1 ml (actual virus content≥100 BID) of 100-fold dilution of virus solution of virulent strain BC6-85((CVCC AV7 strain, purchased from the China Veterinary Drug Administration) of the avian infectious bursal disease. After challenge, clinical signs of the chickens were observed daily, and the numbers of incidence and deaths were recorded. The survived chickens were killed after 72-96 hours, dissections were conducted respectively to observe lesions of the Bursa of Fabricus etc. There should be at least 8 normal chickens in the immunization groups, without lesions of the Bursa of Fabricus; and there should be at least 4 sick chickens in the control group showing significant lesions of the Bursa of Fabricus (e.g. one or more of lesions such as strip-like bleeding of breast or leg muscle, enlargement or shrinking of bursa of Fabricius, yellowing of bursa of Fabricius, jelly-like secretions within bursa of Fabricius). The results are shown in Table 19.

TABLE 19

Results of immunogenicity test of the avian infectious bursal disease virus part of the combined vaccine of avian egg drop syndrome virus

| Group | Immune dose (ml per chicken) | Number of chickens | Results of challenge | |
|---|---|---|---|---|
| | | | Number of incidence | Protection rate |
| 62 | 0.3 | 10 | 0/10 | 100% |
| 63 | 0.3 | 10 | 0/10 | 100% |
| 64 | 0.3 | 10 | 0/10 | 100% |
| 65 | 0.3 | 10 | 0/10 | 100% |
| 66 | 0.3 | 10 | 0/10 | 100% |
| 67 | 0.3 | 10 | 10/10 | 0 |

The results showed that vaccines 8, 12, 15, 17, and 19 could provide complete protection against the virulent strain of the avian infectious bursal disease virus on Day 21 after immunization.

16.6 Immunogenicity Test of Fowl Adenovirus Part 60 21-day-old SPF chickens were divided into 6 groups, that is to say, 10 chickens per group. The chickens in groups 68-72 were immunized by subcutaneous injection in necks with corresponding vaccine 9, 13, 16, 18, and 20 prepared in Example 15, respectively, at an immune amount of 0.3 ml per chicken, and the chickens in group 73 were injected with 0.3 ml of physiological saline by subcutaneous injection, as a blank control. All experimental chicken were fed in isolation. On the 21st day after immunization, the chickens were challenged by intramuscular injection of the virus solution of FAV-HN strain and then were observed for 14 days. The numbers of incidence and deaths and protection rates were recorded. The results are shown in Table 20.

TABLE 20

Results of immunogenicity test of the fowl adenovirus part of the combined vaccine of avian egg drop syndrome virus

| Group | Immune dose (ml per chicken) | Number of chickens | Results of challenge | | |
|---|---|---|---|---|---|
| | | | Number of incidence | Number of deaths | Protection rate |
| 68 | 0.3 | 10 | 0/10 | 0/10 | 100% |
| 69 | 0.3 | 10 | 0/10 | 0/10 | 100% |
| 70 | 0.3 | 10 | 0/10 | 0/10 | 100% |
| 71 | 0.3 | 10 | 0/10 | 0/10 | 100% |

TABLE 20-continued

Results of immunogenicity test of the fowl adenovirus part of the combined vaccine of avian egg drop syndrome virus

| Group | Immune dose (ml per chicken) | Number of chickens | Results of challenge | | |
|---|---|---|---|---|---|
| | | | Number of incidence | Number of deaths | Protection rate |
| 72 | 0.3 | 10 | 0/10 | 0/10 | 100% |
| 73 | 0.3 | 10 | 10/10 | 10/10 | 0 |

The results showed that the control group, the 73rd group all died of the disease, while the immunization groups, groups 68-72 had better immune protection effect on the immunized chickens and the immunization effect was good. It is shown that the oil-emulsion combined vaccine, in which the avian influenza virus strain solution provided by the present disclosure was prepared as antigen, could provide complete protection for the chickens.

It is proved that the combined vaccine of avian egg drop syndrome virus provided by the disclosure can resist the invasion of related pathogens and shows good immunogenicity, and can effectively control the epidemic of diseases associated with avian egg drop syndrome virus in China. Due to the successful development of the subunit antigen of the tFiber protein fragment of avian egg drop syndrome virus, and the application of the endotoxin removal technology after the expression of the subunit protein in E. coli, the development of combined vaccine against major epidemic diseases of poultry has become a reality. The pentavalent vaccine prepared from the subunit antigen of tFiber protein fragment of avian egg drop syndrome virus, the antigen of Newcastle disease virus, the antigen of avian influenza virus, the antigen of avian infectious bronchitis virus, and the subunit antigen of avian infectious bursal disease virus, and the pentavalent vaccine prepared from the subunit antigen of tFiber protein fragment of avian egg drop syndrome virus, the antigen of Newcastle disease virus, the antigen of avian influenza virus, the antigen of avian infectious bronchitis virus, and the subunit antigen of fowl adenovirus achieve simultaneous immunization with five antigens for the first time, omitting complicated immunization procedures.

The foregoing descriptions are merely preferred examples of the present disclosure and are not intended to limit the present disclosure in any form. Although the present disclosure has been disclosed by way of preferred examples, it is to be understood that the disclosure is not limited thereto. A person skilled in the art can make some equivalent variations or modifications to the above-disclosed technical content without departing from the scope of the technical solutions of the present disclosure to obtain equivalent examples. Simple modifications, equivalent changes and modifications made to the above examples according to the technical essence of the present disclosure all fall within the scope of the technical solutions of the present disclosure without departing from the contents of the technical solutions of the present disclosure.

The invention claimed is:

1. A tFiber protein fragment of avian egg drop syndrome virus, wherein a gene that encodes the tFiber protein fragment of avian egg drop syndrome virus consists of the nucleotide sequence of SEQ ID NO. 2.

2. A vaccine composition, wherein the vaccine composition comprises an immune amount of the tFiber protein fragment of avian egg drop syndrome virus of claim 1 or an immune amount of live vector recombined with the gene of the tFiber protein fragment of avian egg drop syndrome virus of claim 1, and a pharmaceutically acceptable carrier.

3. The vaccine composition according to claim 2, wherein the content of the tFiber protein fragment of avian egg drop syndrome virus is indicated as Agar Gel Precipitation (AGP) titer equal to or greater than 1:8.

4. The vaccine composition according to claim 2, wherein the content of the tFiber protein fragment of avian egg drop syndrome virus is indicated as AGP titer within a range of 1:8-1:32.

5. The vaccine composition according to claim 2, wherein the pharmaceutically acceptable carrier is an adjuvant, which comprises one or more of (1) mineral oil, alumina gel adjuvant, saponins, Avridine, didecyl adipate (DDA); (2) water-in-oil emulsion, oil-in-water emulsion, water-in-oil-in-water emulsion; or (3) the polymers of acrylic or methaciylic acid, the copolymers of maleic anhydride and alkenyl derivative; and the Ribi adjuvant system, Block co-polymer, Syntex adjuvant formulation (SAF-m), monophosphoryl lipid A, Avridine lipid-amine adjuvant, heat-labile enterotoxin from *E. coli*, cholera toxin, IMS 1314, muramyl dipeptide, Montanide ISA 206 and Gel adjuvant; and a content of the adjuvant ranges from 5% to 70% V/V.

6. The vaccine composition according to claim 5, wherein the content of the adjuvant ranges from 30% to 70% V/V.

7. The vaccine composition according to claim 5, wherein the content of the adjuvant is 66% V/V.

8. The vaccine composition according to claim 2, wherein the live vector is recombinant attenuated *Salmonella*, recombinant Newcastle disease virus or recombinant poxvirus.

9. The vaccine composition according to claim 2, wherein the vaccine composition further comprises one or more antigens selected from a group consisting of an antigen of Newcastle disease virus, an antigen of avian influenza virus, an antigen of avian infectious bronchitis virus, an antigen of infectious bursal disease virus, an antigen of fowl adenovirus, an antigen of avian reovirus, an antigen of *Escherichia coli*, an antigen of *Avibacterium paragallinarum*, an antigen of *Mycoplasma* Synoviae, an antigen of *Mycoplasma* gallisepticum, an antigen of *Pasteurella multocida*, an antigen of Marek's disease virus, an antigen of avian encephalomyelitis virus and an antigen of infectious laryngotracheitis virus.

10. The vaccine composition according to claim 9, wherein the vaccine composition further comprises one or more antigens selected from a group consisting of an inactivated antigen of Newcastle disease virus, an inactivated antigen of avian influenza virus, an inactivated antigen of avian infectious bronchitis virus, a subunit antigen of infectious bursal disease virus, and an inactivated antigen or a subunit antigen of fowl adenovirus.

11. The vaccine composition according to claim 10, wherein the inactivated antigen of Newcastle disease virus is an inactivated antigen of N7a strain, the inactivated antigen of avian influenza virus is inactivated antigens of HF strain, the inactivated antigen of avian infectious bronchitis virus is inactivated antigen of M41 strain, the subunit antigen of infectious bursal disease virus is VP2 protein of infectious bursal disease virus, the inactivated antigen of fowl adenovirus is inactivated antigens of FAV-HN strain, and the subunit antigen of fowl adenovirus is Penton protein or Fiber-2 protein of the fowl adenovirus.

12. The vaccine composition according to claim 11, wherein the content of tFiber protein fragment of the egg drop syndrome virus is indicated as AGP titer between 1:8 and 1:32, the content of the inactivated antigen of the Newcastle disease virus is $10^{8.0}$-$10^{9.0}$EID$_{50}$/0.1 ml before inactivation, the content of the inactivated antigen of the avian influenza virus is $10^{6.5}$-$10^{8.5}$ EID$_{50}$/0.1 ml before inactivation, the content of the inactivated antigen of the avian infectious bronchitis virus is $10^{6.0}$-$10^{7.0}$ EID$_{50}$/0.1 ml before inactivation, and the content of the VP2 protein of the avian infectious bursal disease virus is indicated as AGP titer between 1:16 and 1:128, the content of the Penton protein of the fowl adenovirus is indicated as AGP titer between 1:2 and 1:16, and the content of the Fiber-2 protein of the fowl adenovirus is indicated as AGP titer between 1:2 and 1:16.

13. The vaccine composition according to claim 11, wherein the content of tFiber protein fragment of the avian egg drop syndrome virus is indicated as AGP titer between 1:8 and 1:32, the content of the inactivated antigen of the Newcastle disease virus is $10^{8.0}$ $EID_{50}$/0.1 ml before inactivation, the content of the inactivated antigen of the avian influenza virus is $10^{8.0}$ $EID_{50}$/0.1 ml before inactivation, the content of the inactivated antigen of the avian infectious bronchitis virus is $10^{6.0}$ $EID_{50}$/0.1 ml before inactivation, and the content of the VP2 protein of the avian infectious bursal disease virus is indicated as AGP titer 1:16, the content of the Penton protein of the fowl adenovirus is indicated as AGP titer 1:4, and the content of the Fiber-2 protein of the fowl adenovirus is indicated as AGP titer 1:4.

* * * * *

SEQUENCE LISTING

<160> NUMBER OF SEQ ID NOS: 2

<210> SEQ ID NO 1
<211> LENGTH: 1935
<212> TYPE: DNA
<213> ORGANISM: Artificial Sequence
<220> FEATURE:
<223> OTHER INFORMATION: Synthetic Sequence

<400> SEQUENCE: 1

```
atgaaacgtc tgcgtctgga cccggacccg gtttacccgt tcggtacctc tgaaaccatc      60
ccgatgccgc cgttcatcga agctggttct ggtctggctg ttaacggtct gcagctgtac     120
atcaccgctc aggctccggt tggtttcacc aacaaagctg ttaccctgaa atacggtgac     180
ggtctggaag ttaacgaaaa cggtgaactg atcgctaccg cttcttctgc tgttaaaccg     240
ccgctgcact tcgaccgtgg ttacatcgtt ctgaacctgc aggacccgct gggtgttatc     300
gacggtaaac tgggtgttaa actgggtccg ggtgttcaca tcaacggtga aggtgctgtt     360
gctgttgaat ctccggttga cccgatcacc tggacaccg ctggtcgtat caccctgaac     420
tacggtaccg tctgaacgt ttctgacggt aaactgcgtc tggtttctcc ggaatctccg     480
ctgacccctgc tgggtaacgg taaagttgct ctgaacttcg gtaactctat ggaactggtt     540
cagggtaccc tgcagctgaa agctccgctg aacccgctgt tcatgacccc ggctggtgct     600
atcggtctgc gtgttgacga catgttcaac atctctgaag gtctgctgtc tttcaaaatg     660
ccgtctgacc cgatctcttt caacgctgac ggtatgctgt ctctgaacac caacgacacc     720
ctgcagacca ccggtggtct gctgggtctg accgaaccgg ctaaaccgct gaaactggct     780
gacggtaaac tgggtgttaa cgttggtctg ggtctggctg tttctaacgg ttctctgacc     840
gttaacgctg tcagggtct gaccatccgt aacaacgctg ttgctgttaa cggtggtaac     900
accctggctt tcaacaacta cggtgaagtt gaactgaaaa accccgcgtaa cccgatctct     960
ctgacccagg acggtgaact ggttctgatc atcggtcacg tctgaccac cctggacggt    1020
cgtctgaccc tgctgaccgc ttctacctct ccgatcgctg ttggtccgac cggtgttacc    1080
ttcaacgtta cccgtctga cttctactc ctgtcttcta aactggctct gaacgttgaa    1140
acccgtggtg gtctggaaaa atctgacacc ggtctgaaaa tcaaacgtgc tgctccgctg    1200
tctatcaccct tgacggtga actgaccctg gcttacgact ctaccgactt ccaggttacc    1260
gaaaacggtc tggctctgaa agtttctccg acccagaccc cgctgacccg tatcatctct    1320
atgggtaaca acctgttcga ctctggttac gaaatcttcg cttcttgccc gcagaacaaa    1380
gctgctaaag ttgctggtta cgtttacctg acctctgttg gtggtctggt tcacggtacc    1440
atccagatca aagctaccgc tggttactgg ttcaccggtg gtaactctgt tcaggaatct    1500
atccgtttcg gtctggttct gtgcccgttc tctgctcgtg acccgaccgc taacctgtct    1560
ggttggccgg ctccggttgt ttggtctggt gactctaaca cccgctgta cttcgctgct    1620
aacgctatct cttacaccaa caacgtgtt aacctggctg ttaccggtaa cttctacaaa    1680
gaagaaaccg aactgccggg ttacacccgt cactctttct gcccgaccgg taccaccggt    1740
atgaacttca ccgtggtaa cctgtacgtt tgcccgtgca ccgttaacac cggtgctacc    1800
acccctgaacg ctatctacat ggttttcgtt atcacccagt ctgctctggg taccaacttc    1860
ttcgcttcta acaccccgcc gaacaccttc ttcctgaccc cgccgatccc gttcacctac    1920
gttggtgctc agtaa                                                    1935
```

<210> SEQ ID NO 2
<211> LENGTH: 741
<212> TYPE: DNA
<213> ORGANISM: Artificial Sequence
<220> FEATURE:
<223> OTHER INFORMATION: Synthetic Sequence

<400> SEQUENCE: 2

```
ccgctgtcta tcacctctga cggtgaactg accctggctt acgactctac cgacttccag      60
gttaccgaaa acggtctggc tctgaaagtt tctccgaccc agaccccgct gacccgtatc     120
atctctatgg gtaacaacct gttcgactct ggttacgaaa tcttcgcttc ttgcccgcag     180
aacaaagctg ctaaagttgc tggttacgtt tacctgacct ctgttggtgg tctggttcac     240
ggtaccatcc agatcaaagc taccgctggt tactggttca ccggtggtaa ctctgttcag     300
gaatctatcc gtttcggtct ggttctgtgc ccgttctctg ctcgtgaccc gaccgctaac     360
ctgtctggtt ggccggctcc ggttgtttgg tctggtgact ctaacacccc gctgtacttc     420
gctgctaacg ctatctctta caccaacaac cgtgttaacc tggctgttac cggtaacttc     480
tacaaagaag aaaccgaact gccgggttac accegtcact ctttctgccc gaccggtacc     540
accggtatga acttcaccgg tggtaacctg tacgtttgcc cgtgcaccgt taacaccggt     600
gctaccaccc tgaacgctat ctacatggtt ttcgttatca cccagtctgc tctgggtacc     660
aacttcttcg cttctaacac cccgccgaac accttcttcc tgaccccgcc gatcccgttc     720
acctacgttg gtgctcagta a                                               741
```